(12) United States Patent
Kakino et al.

(10) Patent No.: US 6,942,436 B2
(45) Date of Patent: Sep. 13, 2005

(54) NC PROGRAM GENERATING METHOD, NC APPARATUS, COMPUTER MEMORY PRODUCT, AND COMPUTER PROGRAM PRODUCT

(75) Inventors: Yoshiaki Kakino, 256-5, Iwakura-Hanazono-cho, Sakyo-ku, Kyoto 606-0024 (JP); Heisaburo Nakagawa, 1700-A-303, Kaideima-cho, Hikone-shi, Shiga 522-0056 (JP); Hirotoshi Ohtsuka, Oita (JP)

(73) Assignees: Yoshiaki Kakino, Kyoto (JP); Heisaburo Nakagawa, Shiga (JP); Mori Seiki Co., Ltd., Nara (JP); Yasda Precision Tools K.K., Okayama (JP); Graphic Products Inc., Chiba (JP)

( * ) Notice: Subject to any disclaimer, the term of this patent is extended or adjusted under 35 U.S.C. 154(b) by 158 days.

(21) Appl. No.: 10/231,463

(22) Filed: Aug. 30, 2002

(65) Prior Publication Data

US 2003/0170085 A1 Sep. 11, 2003

(30) Foreign Application Priority Data

Mar. 11, 2002 (JP) ........................................ 2002-065952

(51) Int. Cl.[7] .................................................. B23C 1/00
(52) U.S. Cl. ......................... 409/84; 409/80; 700/188; 700/182; 700/173; 700/169; 700/86; 700/87
(58) Field of Search .............................. 409/79–80, 84, 409/132; 700/188, 184, 182, 174, 173, 186, 2, 86, 87, 169

(56) References Cited

U.S. PATENT DOCUMENTS

| | | | | |
|---|---|---|---|---|
| 3,866,027 A | * | 2/1975 | Cutler et al. | 318/572 |
| 4,707,793 A | * | 11/1987 | Anderson | 700/188 |
| 4,723,219 A | * | 2/1988 | Beyer et al. | 700/190 |
| 4,833,617 A | * | 5/1989 | Wang | 700/173 |
| 5,083,280 A | * | 1/1992 | Yamamoto et al. | 700/188 |

(Continued)

FOREIGN PATENT DOCUMENTS

| | | | |
|---|---|---|---|
| JP | 6-79580 A | * | 3/1994 |
| JP | 11-156672 | | 6/1999 |
| JP | 2001-370644 | | 12/2001 |
| WO | WO98/41357 A1 | * | 9/1998 |

OTHER PUBLICATIONS

Kakino et al. "Intelligent Endmilling System and Its Application to International Cylindrical Machining with Spiral Curves" 2002 Japan–USA Symposium on Flexible Automation Hiroshima, Japan, Jul. 14–19, 2002.

Hirotoshi Otsuka et al. "Advanced Feed forward Control for Constant Cutting Forces in die Machining" 2002 Japan–USA Symposium on Flexible Automation Hiroshima, Japan, Jul. 14–19, 2002.

Primary Examiner—Erica Cadugan
(74) Attorney, Agent, or Firm—Arent Fox

(57) ABSTRACT

An NC apparatus 1 replaces a required machining shape of a workpiece 5 with a predetermined canned machining cycle depending on a specification of machining conditions including a machining start point, a machining end point, and the size of an end mill E to be used. Calculation of an estimated value of cutting force exerted on the end mill E fed along the assumed tool path during the replaced canned machining cycle is repeated until a predetermined comparison and evaluation result is obtained in comparison with a predetermined appropriate value. Accordingly, the tool path of the end mill E together with the feed rate in each portion of the tool path is determined. This permits generation of an NC program which is used in a NC machine equipped with an end mill serve as a cutting tool, and which optimizes the tool path of the end mill together with the feed rate in each portion of the tool path such as to achieve high machining efficiency and accuracy.

7 Claims, 12 Drawing Sheets

U.S. PATENT DOCUMENTS

| | | | |
|---|---|---|---|
| 5,257,203 A | * 10/1993 | Riley et al. | 700/163 |
| 5,827,020 A | * 10/1998 | Fujita et al. | 409/80 |
| 6,438,445 B1 | * 8/2002 | Yoshida et al. | 700/173 |
| 6,501,997 B1 | * 12/2002 | Kakino | 700/28 |
| 6,597,968 B2 | * 7/2003 | Matsumoto et al. | 700/188 |
| 6,772,039 B2 | * 8/2004 | Kakino et al. | 700/86 |
| 2003/0125828 A1 | * 7/2003 | Corey | 700/186 |

* cited by examiner

NC PROGRAM GENERATING METHOD, NC APPARATUS, COMPUTER MEMORY PRODUCT, AND COMPUTER PROGRAM PRODUCT

BACKGROUND OF THE INVENTION

1. Field of the Invention

The present invention relates to a method for generating an NC (numerical control) program which is used when an NC machine equipped with an end mill serving as a cutting tool cuts into a relatively simple shape, and which determines the tool path of the end mill together with the feed rate in each portion of the tool path such as to decrease wear and damage to the cutting tool and thereby permit as efficient and accurate cutting as possible. The present invention also relates to a computer program and a recording medium storing it.

2. Description of the Related Art

In NC machines for moving a cutting tool along a tool path defined in advance numerically relative to a workpiece fixed on a machining table and thereby machining the workpiece in a predetermined manner, in order to meet the requirements for improvements in machining efficiency and accuracy and for extended life of the cutting tool, it is important to determine appropriately the tool path of the cutting tool together with the feed rate in each portion of the tool path.

In order to meet such requirements, the present inventors has proposed a method for generating tool paths having an appropriate feed rate pattern for drilling and tapping (Japanese Patent Application Laid-Open No. 11-156672 (1999)). This method has been devised with considering the fact that the majority of drilling and tapping are carried out by repeating a canned cycle of the operations of positioning a cutting tool at a machining position; protruding the cutting tool; cutting the workpiece; reaching the target depth; reversing the cutting tool; and retracting the cutting tool. More specifically, in the method, various tool paths for the cutting tool together with the feed rate pattern for each process are determined in advance depending on various machining conditions such as cutting-tool sizes, workpiece material types, and machining depths, and thereby stored in a database, whereby in each process, path data corresponding to a specified machining condition is automatically selected, and then the cutting tool is operated by a servo system on the basis of the selected path data. As such, desired machining is carried out.

According to this method, drilling and tapping are carried out with appropriate cutting-tool feed rates throughout the tool path during the machining and the intermission thereof. Accordingly, the machine tool achieves maximum performance, that is, high machining efficiency and high machining accuracy. Further, the data stored in the database used for the selection of the tool path is renewed on the basis of the detection result of the internal state of the servo system during the machining. This avoids obsolescence of the machine tool, and thereby maintains the high machining efficiency and the high machining accuracy.

NC machines are used not only in a state equipped with a drill or a tap as described above, but also widely in a state equipped with an end mill for cutting the workpiece surface into a diverse shape. In such a case, an operator prepares an NC program for indicating the tool path of the cutting tool, whereby the feeding of the end mill is controlled according to the NC program.

Nevertheless, such an NC program is prepared for each specific desired machining shape on the basis of the operator's skill. As a result, even for an identical machining shape, various NC programs are prepared which have different control parameters such as: the positions of the start and end points of the tool path; and the feed rate and the cutting pitch between the start and end points. As such, it is difficult for unskilled operators to achieve satisfactory machining efficiency and accuracy. Further, in case that an inappropriate NC program is prepared, this program can cause various problems such as: damage or chipping to the cutting tool; and shortened life of the cutting tool due to excessive wear.

Further, even when an NC program is carefully prepared by a skilled operator, the program does not necessarily have the best performance. Thus, there has been the possibility of losing an opportunity of improving the machining performance.

BRIEF SUMMARY OF THE INVENTION

The invention has been devised with considering the above-mentioned problems. An object of the invention is to provide a method for generating an NC program in which in an NC machine equipped with an end mill serving as a cutting tool, the movement of the end mill is replaced with a combination of canned cycles of simple operations similarly to the case of drilling and tapping, whereby the tool path of the end mill together with the feed rate in each portion of the tool path is optimized, and whereby high machining efficiency and accuracy are obtained. Another object of the invention is to provide an apparatus used in the implementation of the method and a computer program for implementing this method and recording medium storing the computer program.

An aspect of the invention is a method for generating an NC program for performing predetermined machining of a workpiece using an end mill, which determines a tool path of the end mill with respect to the workpiece together with a feed rate in each portion of the tool path, the method comprising the steps of: replacing a required machining shape of the workpiece with a predetermined canned machining cycle depending on a specification of machining conditions including a machining start point, a machining end point, and the size of an end mill to be used; calculating an estimated value of cutting force exerted on the end mill during the replaced canned machining cycle; and determining a tool path and a feed rate of the end mill by repeating comparison and evaluation of the calculated estimated value with an appropriate value and calculation of an estimated value until a predetermined evaluation result is obtained.

Another aspect of the invention is an NC apparatus for performing predetermined machining of a workpiece using an end mill, which determines a tool path of the end mill for the workpiece together with a feed rate in each portion of the tool path, the apparatus comprising: machining condition specifying means for specifying machining conditions including a machining start point, a machining end point, and the size of an end mill to be used; replacing means for replacing a required machining shape of the workpiece with a predetermined canned machining cycle depending on the machining conditions specified by the machining condition specifying means; estimated value calculating means for calculating an estimated value of cutting force exerted on the end mill during the canned machining cycle replaced by the replacing means; and evaluating means for comparing and evaluating the calculated estimated value with an appropriate value; whereby a tool path and a feed rate of the end mill is determined by making the estimated value calculating means repeat the calculation of an estimated value until the evaluating means obtains a predetermined evaluation result.

Further another aspect of the invention is a computer memory product readable by a computer to execute a method for performing predetermined machining of a workpiece using an end mill, which determines a tool path of the end mill for the workpiece together with a feed rate in each portion of the tool path, the computer memory product comprising: a first process of replacing a required machining shape of the workpiece with a predetermined canned machining cycle depending on a specification of machining conditions including a machining start point, a machining end point, and the size of an end mill to be used; a second process of calculating an estimated value of cutting force exerted on the end mill by assuming a tool path and a feed rate during the replaced canned machining cycle; a third process of comparing and evaluating the calculated estimated value with an appropriate value; and a fourth process of determining a tool path and a feed rate of the end mill by repeating the second process and the third process until a predetermined evaluation result is obtained.

Still further another aspect of the invention is computer program product for use with NC apparatus, comprising: a computer usable storage medium having a computer readable program code embodied therein for performing predetermined machining of a workpiece using an end mill, which determines a tool path of the end mill for the workpiece together with a feed rate in each portion of the tool path, the computer readable program code comprising: causing a computer to replace a required machining shape of the workpiece with a predetermined canned machining cycle depending on a specification of machining conditions including a machining start point, a machining end point, and the size of an end mill to be used; causing a computer to calculate an estimated value of cutting force exerted on the end mill during the replaced canned machining cycle; and causing a computer to determine a tool path and a feed rate of the end mill by repeating comparison and evaluation of the calculated estimated value with an appropriate value and calculation of an estimated value until a predetermined evaluation result is obtained.

In the invention, a required machining shape is replaced with a predetermined canned machining cycle among a plurality of canned machining cycles prepared in advance, depending on a specification of machining conditions including a machining start point, a machining end point, and the size of an end mill to be used. Then, an estimated value of cutting force exerted on the end mill fed along the assumed tool path during the canned machining cycle is calculated. The process of this calculation is repeated until the estimated value converges into an appropriate value, whereby the tool path of the end mill together with the feed rate in each portion of the tool path is determined.

The above and further objects and features of the invention will more fully be apparent from the following detailed description with accompanying drawings.

DETAILED DESCRIPTION OF THE PREERRED EMBODIMENTS

The invention is described below with reference to the drawings.

Figure 1:
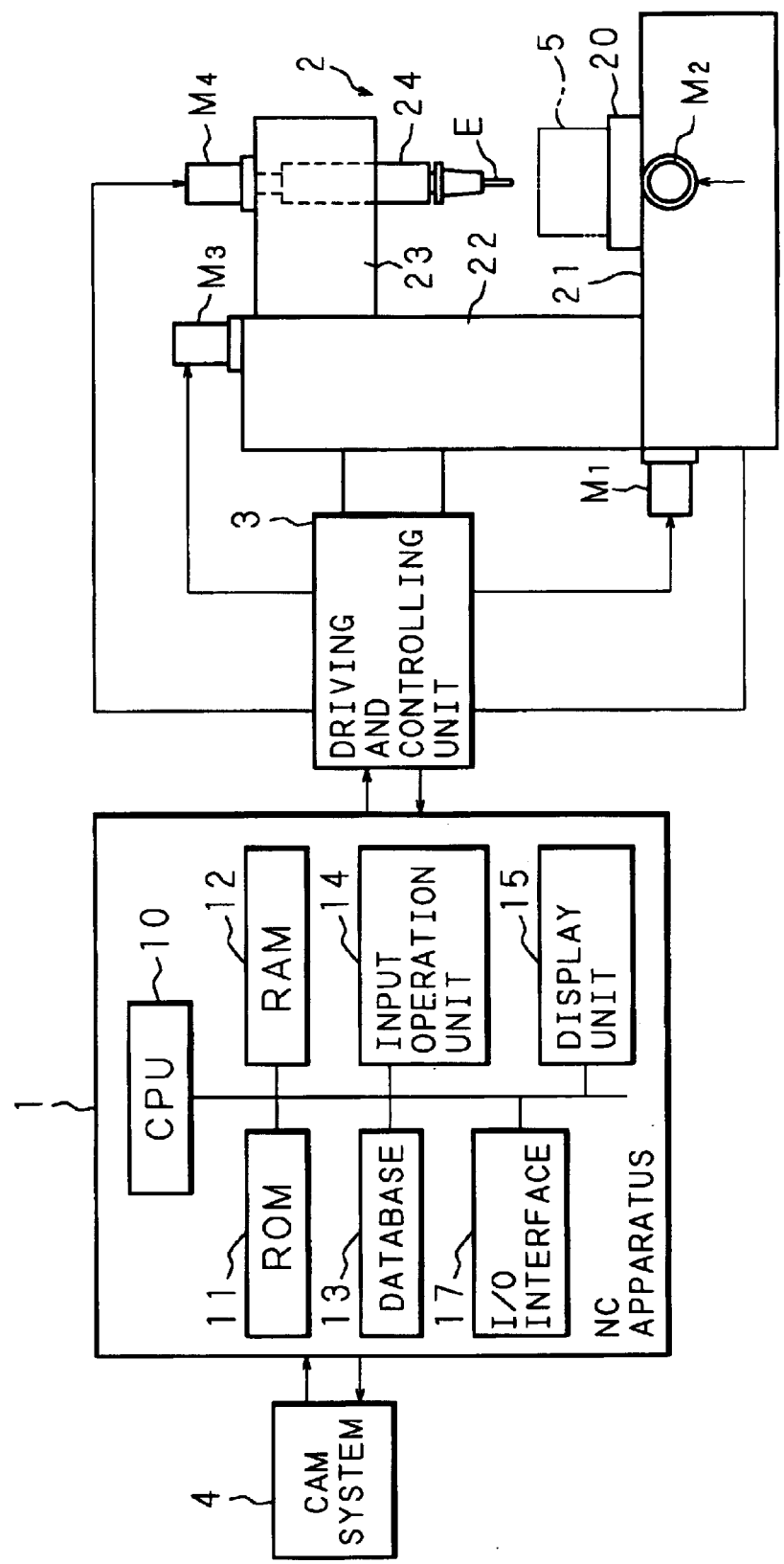
FIG. 1 is a block diagram showing the configuration of an NC machine comprising an NC apparatus used in the implementation of a method according to the invention.

FIG. 1 is a block diagram showing the configuration of an NC machine comprising an NC apparatus used in the implementation of an NC program generating method according to the invention (a method according to the invention, hereafter). As shown in the figure, the NC apparatus 1 is composed of a computer comprising: a CPU (Central Processing Unit) 10 serving as an processing unit; a ROM (Read Only Memory) 11 for storing the procedures of the method according to the invention; a RAM (Random Access Memory) 12 for storing diverse variables necessary in the implementation of the method according to the invention (including values to be initially set and intermediate values during the calculations); and a database 13 referred to in the implementation of the method according to the invention. The NC apparatus 1 further comprises an input operation unit 14 composed of a keyboard, a mouse, and the like to be operated by an operator. Further provided is a display unit 15 composed of a CRT display, a liquid crystal display, or the like for displaying various information obtained in each step in the implementation of the method according to the invention.

The NC machine 2 is constructed so as to execute predetermined machining of a workpiece 5 fixed on a machine table 20 by a (straight) end mill E which rotates around its axis and travels along a predetermined tool path. The machine table 20 is supported on a bed 21 serving as a basement, in a manner slidable in two directions (X and Y directions) perpendicular to each other in a horizontal plane. The end mill E serving as a cutting tool is attached in a removable manner via appropriate attaching means at the bottom end of a spindle 24 drooping from a spindle head 23 supported in a manner slidable in the vertical direction (Z direction) by a column 22 standing on a side of the bed 21.

Inside the bed 21, ball screws (not shown) driven by table feed motors $M_1$ and $M_2$ are provided in a horizontal plane. Rotation of these ball screws feeds the machine table 20 in X and Y directions, respectively. Inside the column 22, a ball (not shown) driven by a spindle head feed motor $M_3$ is provided in a vertical direction. Rotation of this ball screw feeds the spindle head 23 in up and down directions.

The spindle 24 is connected to a spindle motor $M_4$ attached to the upper portion of the spindle head 23. Rotation of the spindle motor $M_4$ rotates the spindle 24 around its axis together with the end mill E attached at the lowest portion of the spindle head 23. In FIG. 1, for the simplicity of illustration, the spindle motor $M_4$ is illustrated to be attached outside the spindle head 23. However, in NC machines for high speed machining, the spindle motor $M_4$ is generally built inside the spindle head 23.

The NC machine 2 having the above-mentioned configuration cuts the workpiece 5 as a machining object in the following manner. That is, the workpiece 5 as a machining object is fixed at a predetermined position on the machine table 20. With an end mill E being attached to the spindle 24 of the spindle head 23, the end mill E is rotated by the spindle motor $M_4$. The workpiece 5 fixed on the machine table 20 is moved relatively to the end mill E by feeding in X and Y directions carried out by the rotation of the table feed motors $M_1$ and $M_2$ and by feeding in Z direction carried out by the rotation of the spindle head feed motor $M_3$. By virtue of this, the end mill E is fed along a tool path defined numerically relative to the workpiece 5, whereby the workpiece 5 is machined into a predetermined shape.

Such a tool path of the end mill E is generated by the NC apparatus 1 on the basis of a later-described method according to the invention, and thereby given via an input and output (I/O) interface 17 to a driving and controlling unit 3. The driving and controlling unit 3 is composed of servo amplifiers for controlling the table feed motors $M_1$ and $M_2$, the spindle head feed motor $M_3$, and the spindle motor $M_4$, and thereby feeding the end mill E along the tool path given from the NC apparatus 1.

The NC apparatus 1 shown in FIG. 1 connects via the I/O interface 17 to a CAM system 4. In the CAM system 4, process design is carried out for defining the procedures of machining of the workpiece 5. The process design includes various steps from defining the operation of each procedure to generating CL (Cutter Location) data. The result of the process design is given via the I/O interface 17 to the NC apparatus 1. Accordingly, in the NC apparatus 1, an NC program is generated on the basis of the result of the process design given from the CAM system 4, or alternatively on the basis of machining conditions inputted directly by an operation of the input operation unit 14.

In the configuration shown in FIG. 1, information is exchanged on line among the NC apparatus 1, the driving and controlling unit 3, and the CAM system 4. However, these apparatuses may be configured off line to each other, whereby information may be exchanged via a appropriate recording medium such as a magnetic disk or an optical disk. Further, the NC apparatus 1 may be incorporated into the CAM system 4, whereby the processes from the process design to the NC program generation may be carried out integrally on the basis of shape data of the workpiece 5 given from a CAD system (not shown). Furthermore, the CAD system and the NC apparatus 1 may be incorporated into the CAM system 4, whereby the processes from the shape design of the workpiece 5, through the process design, to the NC program generation may be carried out integrally.

In the NC apparatus 1 having the above-mentioned configuration, the method according to the invention is implemented in the procedure described below, whereby a calculation is carried out for determining the tool path of the end mill E for machining the workpiece 5 together with the feed rate in each portion of the tool path, and whereby an NC program is generated on the basis of the combination between the tool path and the feed rate obtained from this calculation.

Figure 2:
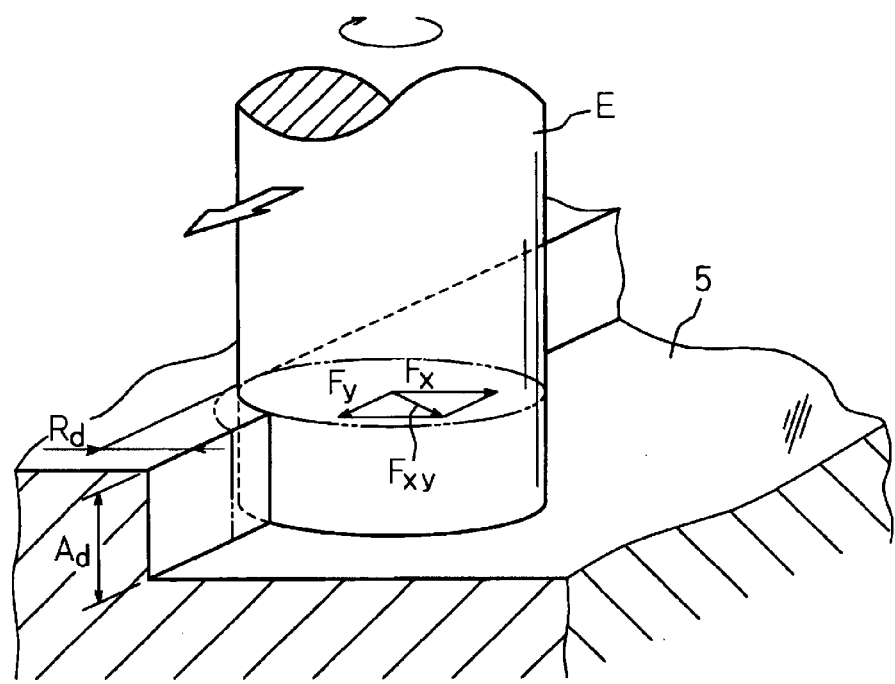
FIG. 2 is a perspective view showing a situation of machining by a straight end mill.
Figure 3:
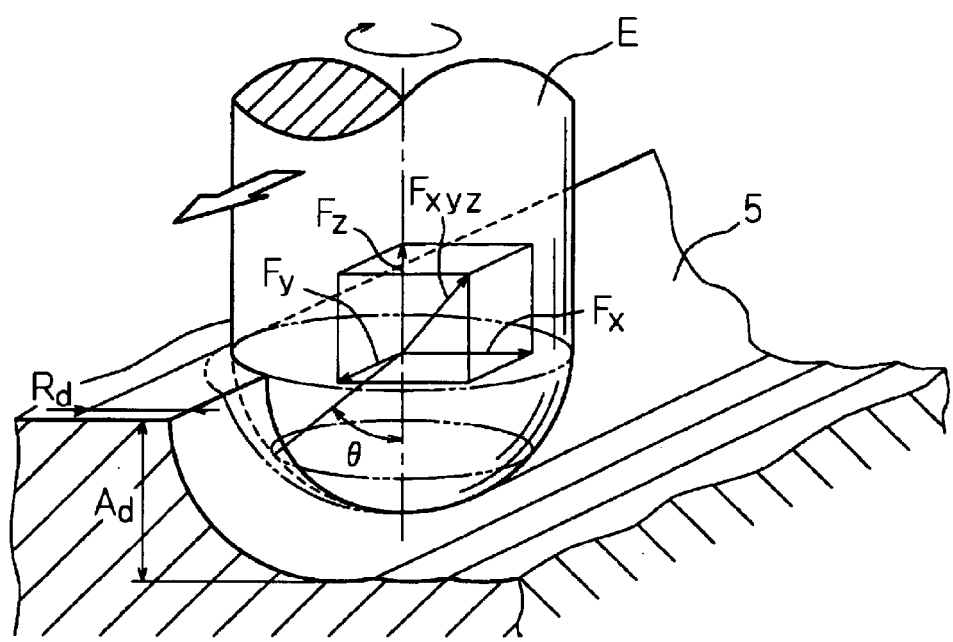
FIG. 3 is a perspective view showing a situation of machining by a ball end mill.

FIG. 2 and FIG. 3 are perspective views showing the situation of machining by end mills. An end mill E shown in FIG. 2 is a straight end mill which has the shape of a cylinder with a flat tip and which comprises a plurality of teeth extending radially from the center of the tip surface and spirally in the side periphery in the vicinity of the tip surface. Another end mill E shown in FIG. 3 is a ball end mill which has the shape of a cylinder with a hemisphere-shaped tip and which comprises a plurality of teeth extending radially from the center of the hemisphere across the entirety of the hemisphere. Each end mill E rotates in the direction indicated by an arrow shown in each figure, is fed in the direction indicated by a white arrow shown in each figure, and thereby machines a workpiece 5.

Figure 4:
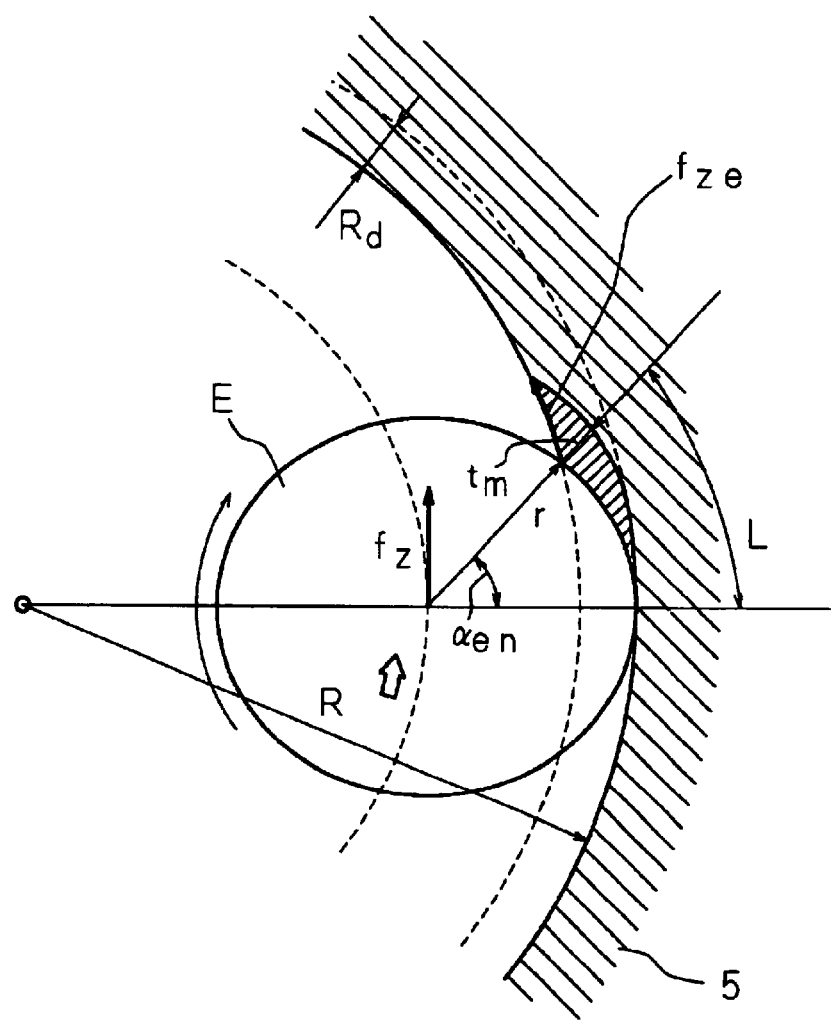
FIG. 4 is a cross sectional plan view showing a situation of machining by an end mill.

FIG. 4 is a cross sectional plan view showing the situation of machining by an end mill. When viewed in a cross section perpendicular to the axis, the situation of machining by the end mill E is common to both straight and ball end mills. A cross section of the workpiece 5 hatched in the figure is machined by the teeth provided in the circumferential surface of the end mill E during the process in which the end mill E rotates in the direction indicated by the arrow shown in the figure, fed along a tool path 6 defined outside the cross section in the direction indicated by a white arrow shown in the figure, and thereby cuts the workpiece 5 successively by the amount of the cutting depth in the radial direction (radial depth of cut $R_d$). At this time, the end mill E, more specifically the teeth around the end mill E, receives a cutting force $F_{xy}$ within the two-dimensional plane (X-Y plane) containing the tool path 6. The force $F_{xy}$ is a resultant force between a cutting force $F_y$ in the feeding direction and a cutting force $F_x$ in a direction perpendicular to the feeding direction.

In the method according to the invention, in order to maintain the cutting force $F_{xy}$ exerted on the end mill E at constant, generated is an NC program for defining the tool path 6 of the end mill E as a combination of predetermined canned machining cycles according to the shape required for the workpiece 5. The canned machining cycles include, for example, the following five machining cycles.

(a) Pocketing or internal cylindrical machining using spiral curves.

(b) Medium or large boring using helical curves.

(c) Slotting using trochoid curves.

(d) Conical hole machining using helical curves.

(e) Slotting by round-trip machining of side surface (including the machining of the side surface of a step section).

Among these machining cycles, when a cycle (a) or (b) is used, the NC program is generated on the basis of a machining condition inputted directly to the NC apparatus 1 by an operation of the input operation unit 14. When a cycle (c), (d), or (e) is used, the NC program is generated on the basis of the result of process design given from the CAM system 4.

In the method of the invention, the estimated value of the cutting force $f_{xy}$ exerted on the end mill E in each portion of the tool path 6 needs to be calculated. The estimated value is obtained by the response surface methodology used as an approximation technique in optimization in various design problems, similarly to a case of machining of a mold requiring non-routine processes which is proposed in Japanese Patent Application No. 2001-370644 (which is equivalent to U.S. Pat. No. 6,772,039) proposed by the present inventors.

When the end mill E used in machining is a straight end mill as shown in FIG. 2, the cutting forces $F_x$ and $F_y$ exerted on the end mill E are substantially identical to each other in each cross section within the length of the amount of cut in the axial direction (axial depth of cut $A_d$: see FIG. 2). Accordingly, on the machining condition that the axial depth of cut $A_d$ is constant, the estimated value of the cutting force $F_{xy}$ which is a resultant force between the two cutting forces is obtained from a two-variable response surface depending on two explanation variables of the estimated maximum undeformed chip thickness $t_m$ and the cutting arc length L shown in FIG. 4.

The maximum undeformed chip thickness $t_m$ is the maximum undeformed chip thickness before deformation expected to be cut by each of the teeth around the end mill E. The cutting arc length L is the length of contact between the peripheral surface of the end mill E under machining and the machined surface of the workpiece 5.

In contrast, when the end mill E used in machining is a ball end mill as shown in FIG. 3, in addition to the cutting forces $F_x$ and $F_y$, a cutting force $F_z$ is exerted on the end mill E in a direction perpendicular to the former two cutting forces. The estimated value of the resultant cutting force $F_{xyz}$, which is a resultant force of these three cutting forces, is calculated on the basis of a response surface whose explanation variables are composed of the active angle θ together with the other explanation variables of the maximum undeformed chip thickness $t_m$ and the cutting arc length L.

As shown in FIG. 3, the active angle θ is defined as the angle between a radius where the hemisphere-shaped tip of the end mill E contacts with the workpiece 5 and the axis of the end mill E, in an axis plane. Accordingly, the active angle θ indicates the length of the portion relating to the cutting along the outer periphery in the axis plane. Further, the active angle θ corresponds to the axial depth of cut $A_d$ in a machining process using a straight end mill as shown in FIG. 2.

In the internal cylindrical machining shown in FIG. 4, R (mm) denotes the inner arc radius after the machining, r (mm) denotes the end mill radius (radius of the end mill E), $f_z$ (mm/tooth) denotes the amount of feed per tooth, $f_{ze}$ (mm/tooth) denotes the amount of feed per tooth at the tool tip, and $\alpha_{en}$ (rad) denotes the engage angle of the portion of the end mill E relating to the machining. Then, the following Equations (1) through (5) hold as the relations among these values, the maximum undeformed chip thickness $t_m$, and the cutting arc length L, which are obtained from geometrical relations within the plane of FIG. 4.

$$(R-R_d)^2=(R-r)^2-r^2-2(R-r)r\cdot\cos(\pi\cdot\alpha_{en}) \quad (1)$$

$$t_m=f_{ze}\cdot\sin(\alpha_{en}-\alpha) \quad (2)$$

$$\sin\alpha=r\sin\alpha_{en}/(R-R_d) \quad (3)$$

$$f_{ze}=f_z\cdot(R-R_d)/(R-r) \quad (4)$$

$$L=r\cdot\alpha_{en} \quad (5)$$

In a machining situation that the cutting force exerted on the bottom teeth in the tip of the end mill E is negligibly small in comparison with the cutting force exerted on the side teeth provided on the circumferential surface, and with the assumption that the axial depth of cut $A_d$ is constant as described above, the time average values of the cutting force $F_y$ in the direction of the feed of the end mill E and the cutting force $F_x$ in a direction perpendicular to the direction of the feed are both determined by the maximum undeformed chip thickness $t_m$ and the cutting arc length L.

From experiments, such a relation holds not only in the internal cylindrical machining for inner arc (concave) portion as shown in FIG. 4, but also in the external cylindrical machining for outer arc (convex) portion and straight machining for straight portion. The inner arc (concave) portion is a portion the machined curvature center of which is located outside the workpiece 5 and which is convex toward the inside. In contrast, the outer arc (convex) portion is a portion the machined curvature center of which is located inside the workpiece 5 and which is convex toward the outside. The straight portion is a portion the machined curvature R of which is infinity.

In the method according to the invention, the tool path is set such as to satisfy the geometrical condition that the maximum undeformed chip thickness $t_m$ and the cutting arc length L are constrained at constant, whereby the estimated value of the cutting force $F_{xy}$ is maintained at constant. Then, the feed rate in each portion of the tool path is determined such that the estimated value is maintained within a predetermined allowable range, whereby an NC program is generated using the above-mentioned canned machining cycles and thereby permitting the machining of the workpiece 5 into a predetermined shape.

Assuming that the maximum undeformed chip thickness $t_m$ and the cutting arc length L are constant, and substituting Equations (2) through (5) into Equation (1), the following Equation (6) is obtained.

$$t_m=f_z\cdot\sin(L/r)=f_z\cdot\sin\alpha_{en} \quad (6)$$

As seen from Equation (6), when a geometrical constraint is placed such that the maximum undeformed chip thickness $t_m$ and the cutting arc length L are constant, the feed rate (feed rate of the center of the end mill E) $f_z$ in each portion of the tool path is maintained at constant. The feed rate $f_z$ is maintained at constant regardless of the machined radius R of the inner arc (concave) portion. Accordingly, this method is applicable to the above-mentioned canned machining cycle (a), that is, the pocketing or internal cylindrical machining using spiral curves.

Figure 5:
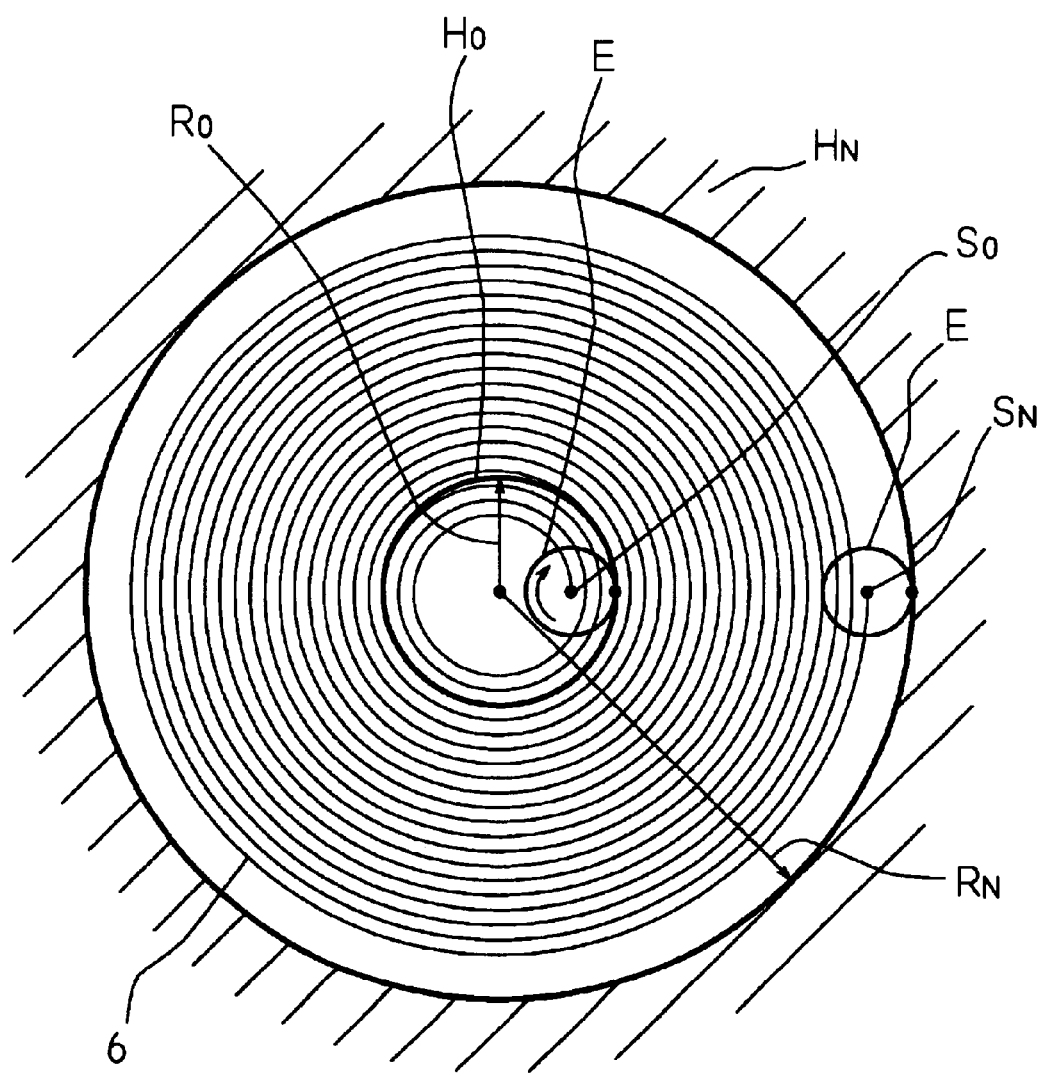
FIG. 5 is a plan view showing a situation of machining using a spiral curves.

FIG. 5 is a plan view showing a situation of pocketing or internal cylindrical machining using spiral curves. The machining starts at start point $S_0$ where the peripheral surface of the end mill E contacts with a portion of the inner circumferential surface of a prepared hole $H_0$ machined by a drill or the like and having a circular cross section. The end mill E is fed along a tool path 6 having a spiral shape extending outward, and thereby expanding the radius of the prepared hole $H_0$ successively. Then, the machining is terminated at end point $S_N$ where the machined inner arc radius R reaches substantially the finish radius $R_N$ of the finish hole $H_N$. In general, the radius of the spiral increases continuously in each turn. However, the spiral may be replaced by a set of circles each radius of which increases stepwise in each turn.

Figure 6:
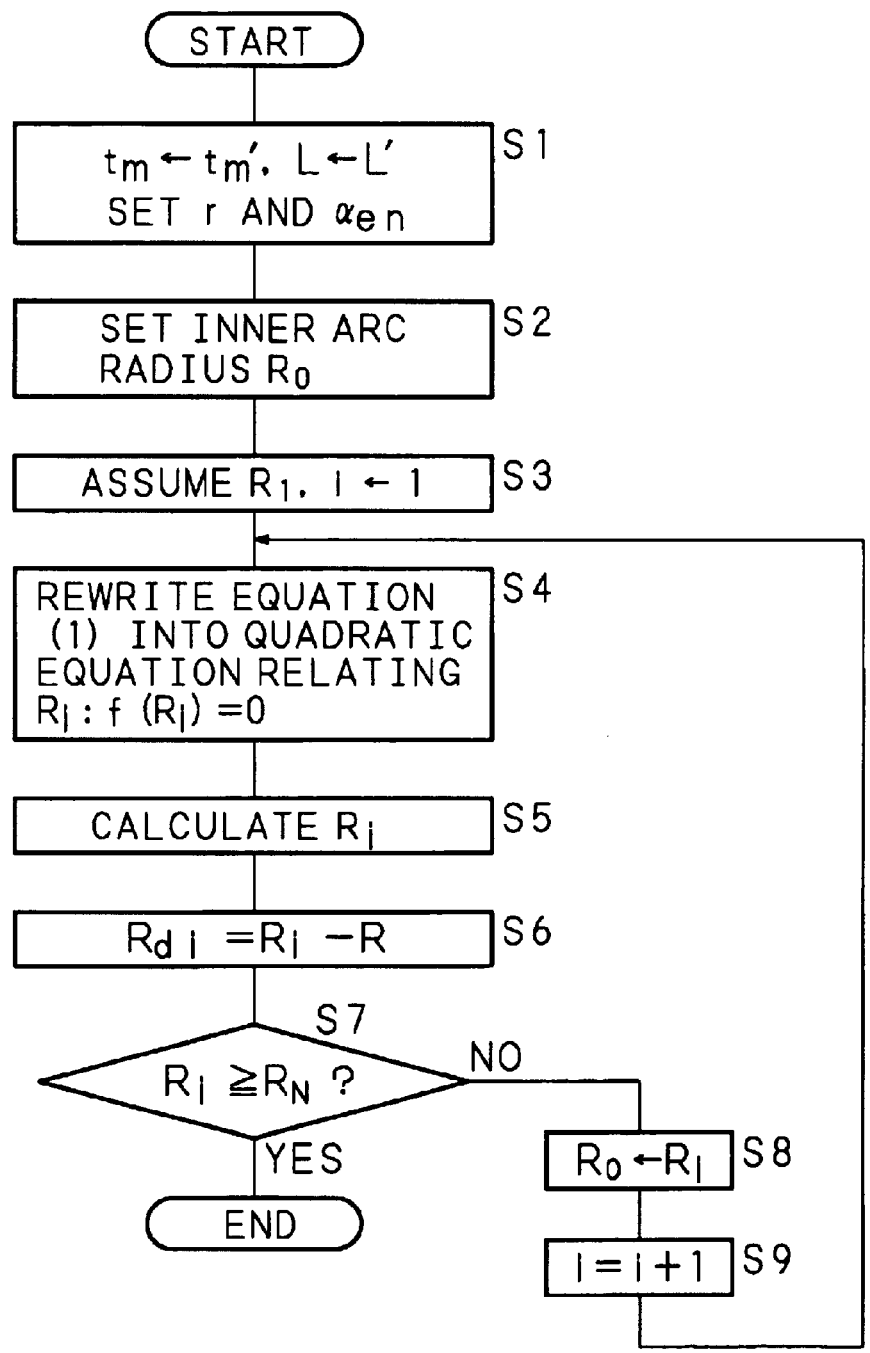
FIG. 6 is a flowchart of an exemplary procedure of the method according to the invention applied to a machining using a spiral curves.

FIG. 6 is a flowchart of an exemplary procedure of the method according to the invention carried out by the NC apparatus 1 applied to the pocketing or internal cylindrical machining using spiral curves. Initial values $t_m'$ and L' are set for the maximum undeformed chip thickness $t_m$ and the cutting arc length L, while an end mill radius r and a engage angle $\alpha_{en}$ are defined (step S1).

The initial values for the maximum undeformed chip thickness $t_m$ and the cutting arc length L are constants, for example, calculated for a standard machining condition such as straight machining according to Equations (1) through (5), and given to the NC apparatus 1 by an operation of the input operation unit 14. Alternatively, when the NC apparatus 1 and the CAM system 4 can exchange information with each other, the initial values $t_m'$ and L' may be given as the result of process design.

The end mill radius r may be determined by an operator, and then given to the NC apparatus 1 by an operation of the input operation unit 14. Alternatively, the NC apparatus 1 may select automatically an end mill radius r among a plurality of end mills E prepared in 2-mm pitch, depending on the radius (minimum circular arc radius) of the prepared hole $H_0$ specified by an operation of the input operation unit 14 and according to a selection criterion from the viewpoint of removing the chips.

The inner arc radius $R_0$ before machining of the workpiece 5 is set at the start of machining (step S2). Then, the inner arc radius to be machined in the first path is assumed as $R_1$ (step S3). After that, repeated calculations are carried out in step S4 and the subsequent steps. The inner arc radius $R_0$ before machining in the first path is a known value given as the radius of the prepared hole $H_0$, while the inner arc radius $R_1$ to be machined is set as an unknown parameter.

After the above-mentioned setting, Equation (1) is rewritten into a quadratic equation relating to an unknown parameter $R_i$ (i=1) (step S4). Solving this quadratic equation, $R_i$ is obtained (step S5). From the difference between $R_i$ and $R_0$, the radial depth of cut $R_{di}$ is obtained for the i-th path (step S6).

It is checked whether the present inner arc radius $R_i$ has reached the finish radius $R_N$ (step S7). When the machined radius does not yet have reached the finish radius $R_N$ (NO in step S7), the inner arc radius $R_0$ before machining is replaced with the present inner arc radius $R_i$ (step S8). Then, path number i is incremented (step S9), and then the procedure returns to step S4. As such, the calculations in steps S4 through S6 are repeated, whereby the radial depth of cut $R_{di}$ is calculated successively for the i-th path (i=1, 2, . . . ), until it is found in step S7 that the machined radius has reached the finish radius $R_N$.

According to the above-mentioned procedures, determined is a tool path having a spiral shape extending outward, increasing successively the radial depth of cut $R_{di}$, and thereby expanding the radius continuously or stepwise. Such determination of a tool path can be carried out with varying the maximum undeformed chip thickness $t_m$, the cutting arc length L, the end mill radius r, and the engage angle $\alpha_{en}$. For each obtained tool path, the estimated value of the cutting force $F_{xy}$ (or $F_{xyz}$) is calculated using the radial depth of cut $R_{di}$, the axial depth of cut $A_d$ (or alternatively, the active angle $\theta$), the maximum undeformed chip thickness $t_m$, and the cutting arc length L. Then, on the condition that the estimated value falls within a predetermined allowable range, a tool path permitting as efficient machining as possible is selected.

In the selection of the tool path, the estimated value of the cutting force may be displayed on the display unit 15 at each time when a tool path is determined, whereby an operator may select a tool path. Alternatively, the NC apparatus 1 may evaluate the cutting force and the machining efficiency at each time when a tool path is generated, whereby the optimum tool path may be selected automatically on the basis of the evaluation.

In the machining by the end mill E, deflecting of the end mill E caused by the cutting force can result in a form error in the depth direction and an insufficient cut, and hence cause a decrease in machining accuracy. Accordingly, for the purpose of accurate machining, the allowable limit of the cutting force is determined on the basis of the amount of deflecting of the end mill E, whereby this allowable limit is used at least in the selection of the final turn of the tool path. The amount of deflecting of the end mill E is calculated on the basis of the radius, the protrusion length, and the material of the end mill E together with the cutting force.

The NC program determined in the above-mentioned procedures is given to the driving and controlling unit 3. The driving and controlling unit 3 drives and controls the table feed motors $M_1$ and $M_2$, the spindle head feed motor $M_3$, and the spindle motor $M_4$, whereby machining is carried out for the workpiece 5 fixed on the machine table 20 of the NC machine 2. Meanwhile, in the NC program generated in the above-mentioned procedures, the cutting force exerted on the end mill E during the machining is as high as substantially the limit value in order to achieve high machining efficiency. Accordingly, machining is critical in some cases. Thus, the driving and controlling unit 3 preferably acquires the feed current values of the table feed motors $M_1$ and $M_2$ as signals indicating the actual cutting force during the machining, whereby the feed rate is variably controlled by means of feedback based on the signals.

The feed current values of the table feed motors $M_1$ and $M_2$ may be compared with the initial values, whereby the amount of wear of the tool may be estimated. In this estimation, the cutting force estimated from the present feed current values is compared with the initial value, whereby the increment is obtained. Then, the increment value is compared with an estimation table prepared in advance, whereby the amount of wear is obtained. As a result, when an excessive wear is found, the display unit 15 displays a predetermined message, and thereby notifying the operator.

Figure 7:
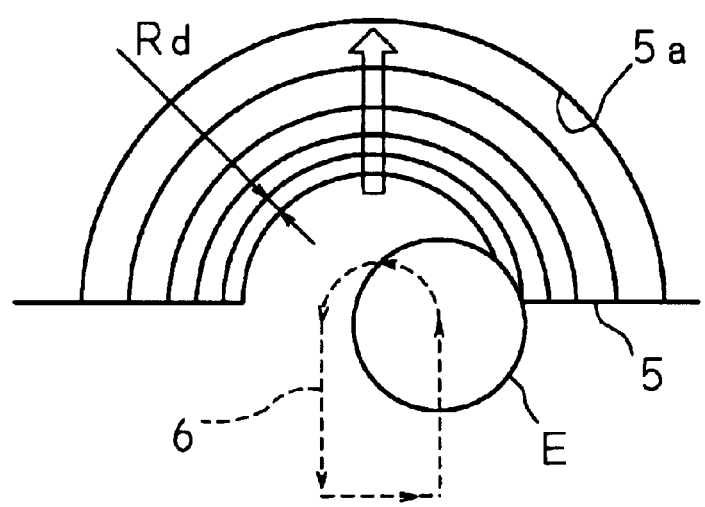
FIG. 7 is a plan view showing another situation of machining using a spiral curves.

The above-mentioned machining using spiral curves is applicable not only to the inside-circular-portion machining for expanding a machined region such as a pocketing and an internal cylindrical machining, but also to the outside-circular-portion machining for reducing a machined region. As shown in FIG. 7, when a cut portion 5a having a half-circle shape is to be formed inward from an tip surface of the workpiece 5, tool paths 6 each comprising a half circle having a radius successively increasing in each turn may be used as indicated by broken lines in the figure. As such, when the end mill E is fed along the tool paths 6, the cut region is expanded as indicated by a white arrow.

Figure 8:
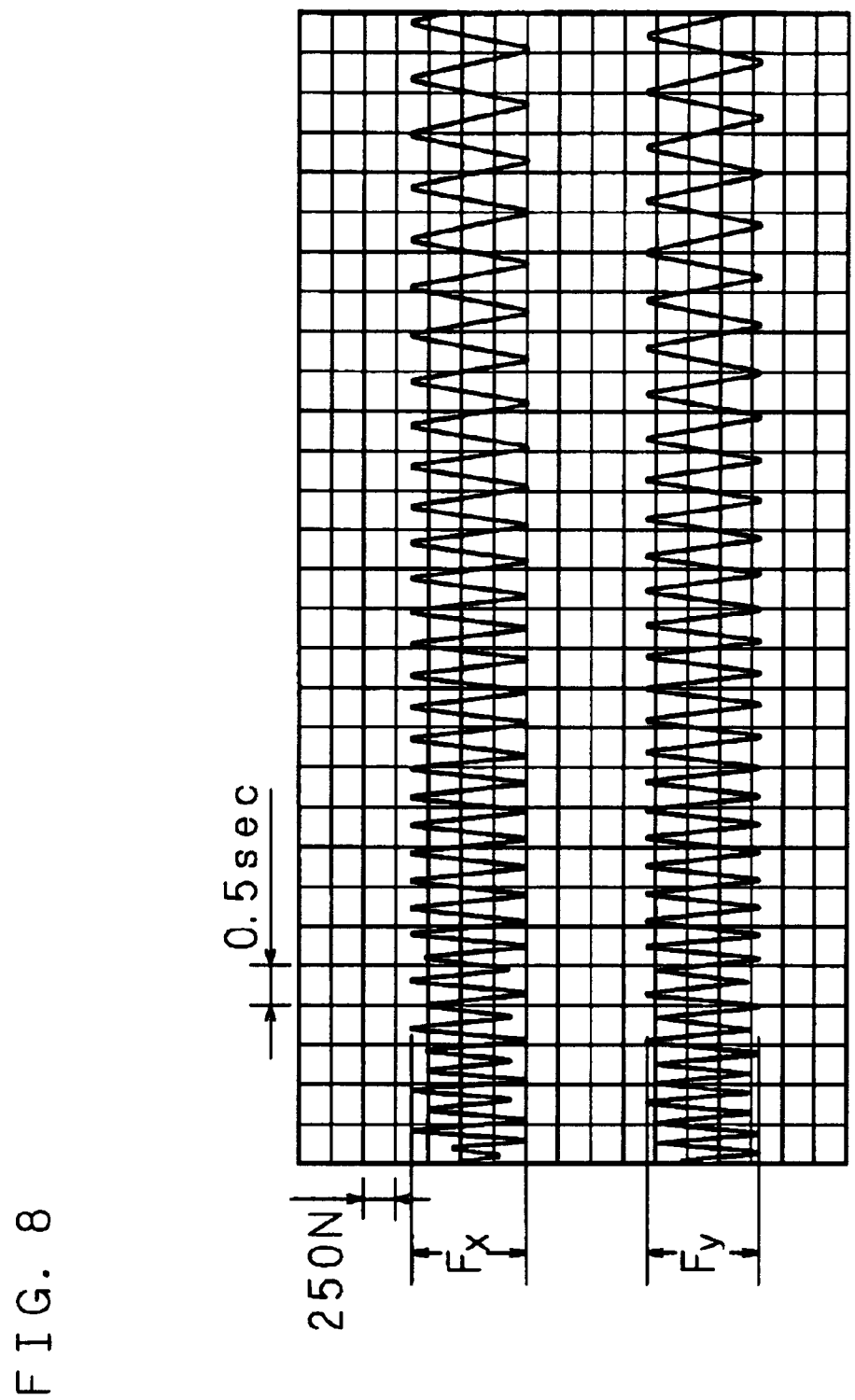
FIG. 8 is a graph showing the measured values of cutting force during the machining shown in FIG. 5.

FIG. 8 is a graph showing the measured values of cutting forces $F_x$ and $F_y$ during the machining along the tool path shown in FIG. 5. The amplitudes of the waveforms in the figure indicate the measured values of cutting forces $F_x$ and $F_y$. As seen from the graph, the cutting forces $F_x$ and $F_y$ and the cutting force $F_{xy}$, which is a resultant force to the former two, are maintained well at constant throughout the tool path composed of inner arc (concave) portions each having successively increasing radius.

Figure 9:
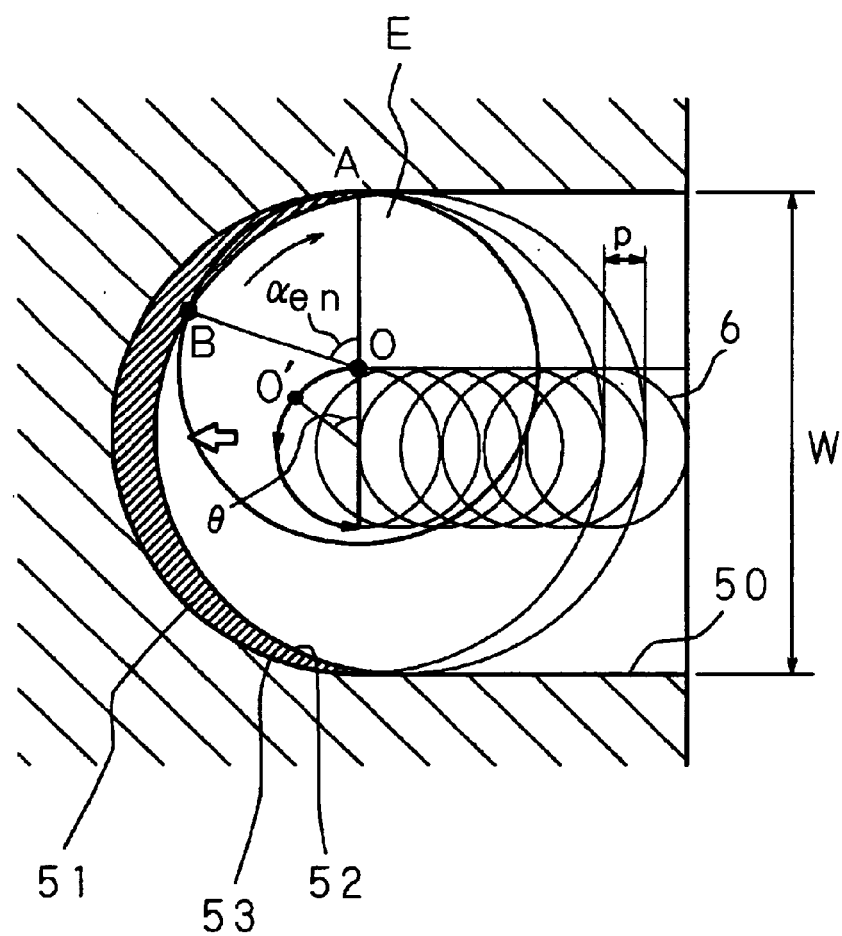
FIG. 9 is a plan view showing a situation of slotting using trochoid curves.

The canned machining cycle (c), that is, the slotting using trochoid curves is described below. FIG. 9 is a plan view showing a situation of slotting using trochoid curves. In this machining, a slot 50 provided in the workpiece 5 is extended in a length direction, using an end mill E having a radius smaller than the width W of the slot 50. In this case, the end mill E is fed along a tool path 6 having a trochoid shape inside the slot 50, and thereby moves in a direction indicated by a white arrow. Accordingly, a cut region 51 having a crescent shape in the leading edge of the slot 50 is cut and removed. This tool path 6 is given as the result of process design in the CAM system 4.

In contrast to the above-mentioned machining using spiral curves shown in FIG. 5, in the present machining, the end mill E relates to the machining of the cut region 51 only in the leading half of the end mill E in the machining progress direction in each turn of the tool path 6. Further, the maximum undeformed chip thickness $t_m$ and the cutting arc length L vary continuously in the cut region 51. Accordingly, it is insufficient to determine only the feed pitch (the amount of cut in the longitudinal direction of the slot) p of each turn of the tool path. Thus, the feed rate also needs to be adjusted within each turn of the tool path.

In the machining of a slotting using trochoid curves, the following Equation (7) holds in addition to Equations (1) through (5). The $\alpha_{en}$ appearing in Equation (7) denotes an angle (the engage angle) in which the end mill E relates to the cutting in the cut region 51 as shown in FIG. 9. Point O is the center of the end mill E. Point A is a contact point between a circular arc 53 after machining of the cut region 51 and the periphery surface of the end mill E. Point B is a intersecting point between a circular arc 52 before machining of the cut region 51 and the periphery surface of the end mill E. FIG. 9 shows a case that the phase angle of the center of the end mill E is θ (active angle).

$$\alpha_{en} = \alpha_{en}(\theta) = \cos^{-1}\left(\frac{\overrightarrow{OA} \cdot \overrightarrow{OB}}{r^2}\right) \quad (7)$$

Figure 10:
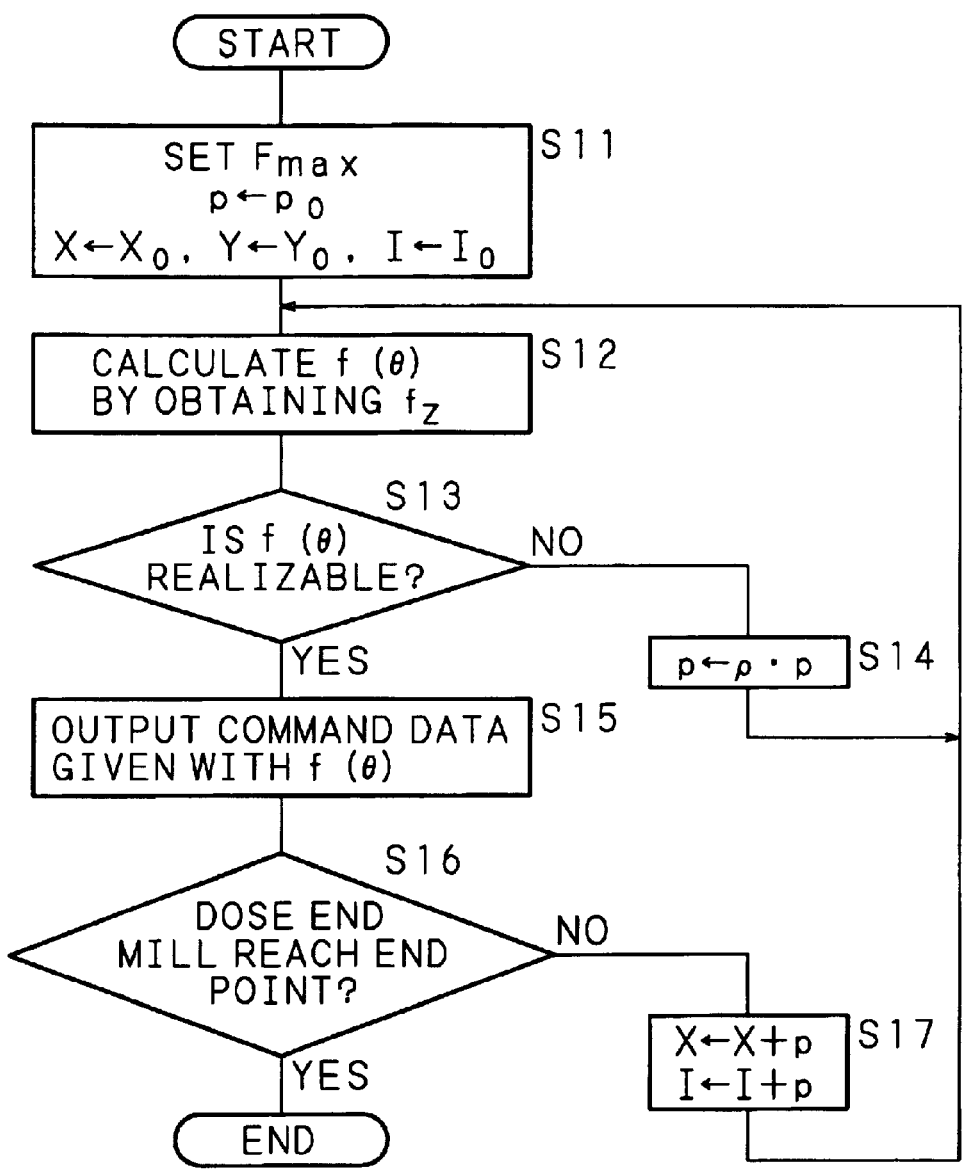
FIG. 10 is a flowchart of an exemplary procedure of the method according to the invention applied to a slotting using trochoid curves.

FIG. 10 is a flowchart of an exemplary procedure of the method according to the invention carried out by the NC apparatus 1 applied to the above-mentioned slotting using trochoid curves. An allowable limit $F_{max}$ for the cutting force is defined. The feed pitch p is set to be an initial value $p_0$. The position coordinates X and Y and the feed length I in the X direction are set to be initial values $X_0$, $Y_0$, and $I_0$, respectively (step S11).

The feed rate $f_z$ of the center of the end mill E in each portion of the tool path is obtained, whereby a feed rate f(θ) causing the cutting force to be $F_{max}$ is calculated (step S12). The feed rate f(θ) is obtained as follows. That is, according to Equations (5) and (7), a cutting arc length L(θ) is calculated. Then, the calculated L(θ) is substituted into a cutting force estimation equation, whereby a quadratic equation with respect to $t_m(\theta)$ is obtained. Solving the quadratic equation, $t_m(\theta)$ is obtained. The obtained $t_m(\theta)$ is substituted into the following Equation (8), whereby $f_z(\theta)$ is obtained. From the $f_z(\theta)$, the f(θ) is easily obtained.

$$f_z(\theta) = t_m(\theta)/\sin[\alpha_{en}(\theta)] \quad (8)$$

Realizability of the feed rate f(θ) calculated in step S12 is checked (step S13). The check is based on mechanical constraints such as whether the amount of cut per tooth falls within an appropriate range and whether the driving system of the NC machine 2 can follow the feed rate f(θ) serving as a speed command value.

When the feed rate is found to be unrealistic in step S13, the present feed pitch p is multiplied by a correction factor ρ, whereby a new feed pitch p is obtained (step S14). Then, the procedure returns to step S12, whereby the calculation and the realizability check of the feed rate f(θ) are repeated. The correction factor ρ used in step S14 may be a predetermined constant. However, when the ratio between the present value and the allowable limit for the above-mentioned amount of cut per tooth is used, convergence is speeded up and hence calculation time is reduced.

In contrast when the feed rate is found to be realizable in step S13, command data given with the present feed rate f(θ) is outputted (step S15). Then, it is judged whether the end mill E has reached a predetermined end point (step S16). When the end mill E does not yet have reached the predetermined end point (NO in step S16), a feed pitch p is added to the coordinates X and Y (step S17), and then similar calculations are carried out for the subsequent turns. When the end mill E has reached the predetermined end point (YES in step S16), the procedure is terminated.

In the calculation in each turn of the tool path, the turn may be divided into a plurality of segments, whereby the coordinates X and Y, the values I and J, and the feed rate F may be defined for each segment. Alternatively, each turn may be treated as a single segment, whereby a feed rate pattern may be defined in a parametric manner in the segment. Here, the values I and J indicate feed lengths in the X and Y directions, respectively.

Figure 11:
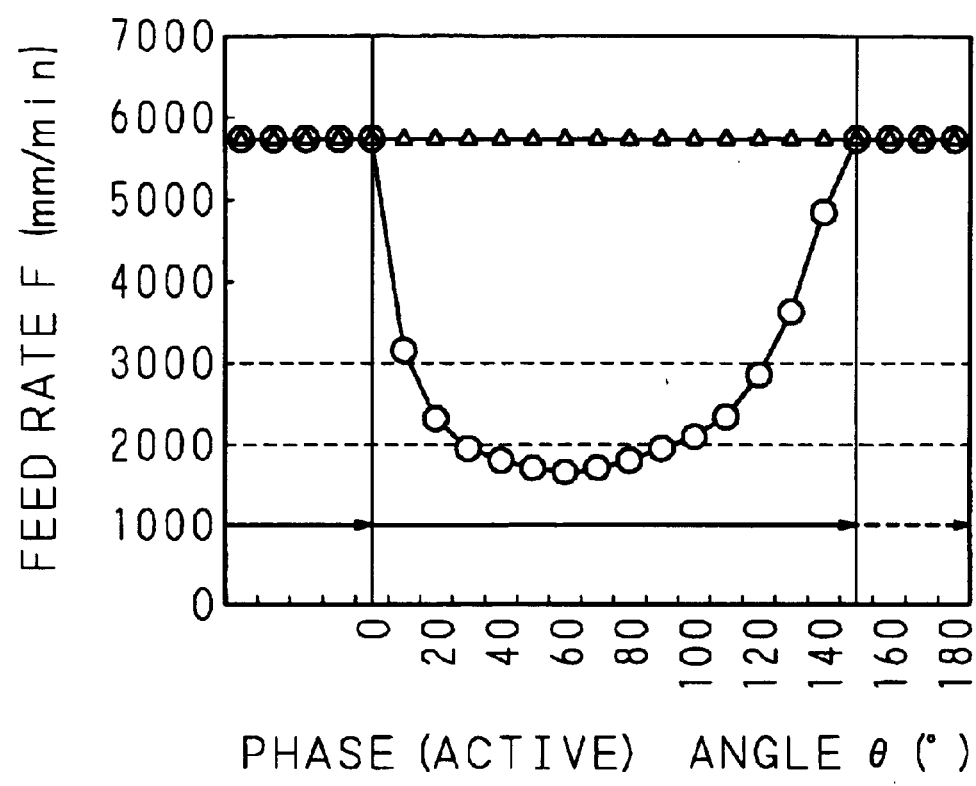
FIG. 11 is a diagram showing an example of feed rate distribution determined according to the flowchart shown in FIG. 10.

FIG. 11 is a graph showing an example of the feed rate f(θ) obtained in step S13. Feed rate values f(θ) indicated by white circles distribute continuously with respect to the initial values indicated by white triangles in the figure, within a range of phase angle (active angle) θ range of approximately 150° relating to the cutting of the cut region 51. The distribution of the white circles corresponds substantially to the distribution of the maximum undeformed chip thickness $t_m$ in the cut region 51 having a crescent shape shown in FIG. 9. This shows that the cutting force is maintained at constant.

In the above-mentioned embodiment, a dedicated apparatus (NC apparatus 1) for implementing the method according to the invention has been used. However, without using such an apparatus, the above-mentioned procedures may be recorded as a computer program into a computer-readable recording medium. This recording medium may be mounted on a general-purpose computer, whereby the program may be loaded up. Then, the method according to the invention may be implemented using the CPU and the RAM of the computer as the processing unit and the storage unit of the invention.

Figure 12:
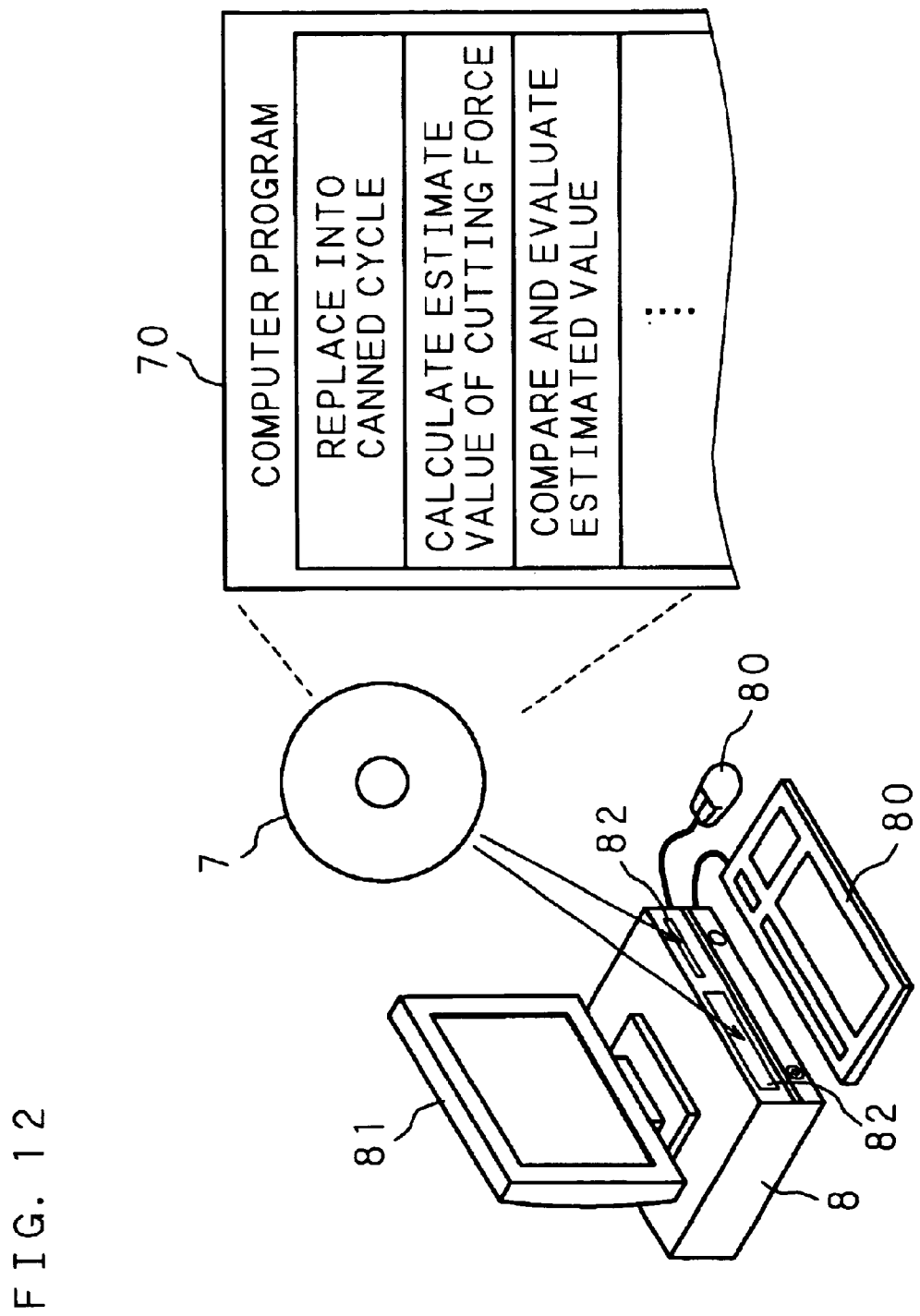
FIG. 12 is a schematic diagram showing another embodiment of the invention.

FIG. 12 is a schematic diagram illustrating such an embodiment. In the figure, numeral 7 denotes a recording medium such as an optical disk or a magnetic disk. In the recording medium 7, a computer program 70 containing program codes for causing a computer to execute the procedures corresponding to the respective steps shown in the flowchart of FIG. 10 is recorded.

The recording medium 7 is mounted on a disk drive 82 of a general purpose computer 8 comprising: inputting means 80 such as a keyboard and a mouse; and displaying means 81 such as a CRT display or a liquid crystal display; whereby the program is read out by the computer. Accordingly, the computer program 70 stored in the recording medium 7 is loaded up to the computer 8, whereby the computer 8 implements the method according to the invention. In addition to the use of the recording medium 7, the loading-up of the computer program 70 to the computer 8 may be carried out in another appropriate method such as the use of another computer connected on line through a network such as the Internet.

As described above, in the NC program generating method and the NC apparatus according to the invention, the required machining shape of a workpiece is replaced with a canned machining cycle. The estimated value of the cutting force exerted on the end mill traveling along the canned machining cycle is calculated. Accordingly, the tool path of the end mill together with the feed rate is determined such that the estimated value is maintained at an appropriate value. This permits generation of an NC program for decreasing wear and damage to the end mill and achieving high machining efficiency and accuracy, without the necessity of a large amount of operator's experience and laborious procedures.

Further, when the computer program according to the invention is loaded up from a recording medium in which the computer program is recorded to a general-purpose computer, the NC program generating method according to the invention is implemented. This permits a general-purpose computer such as a personal computer to generate easily an NC program for achieving high machining efficiency and accuracy. These are the advantages of the invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for generating an NC program for performing predetermined machining of a workpiece using an end mill, said NC program determining a tool path of said end mill with respect to said workpiece and a feed rate in each portion of said tool path, said method comprising:
    a first step of replacing a required machining shape of said workpiece with a predetermined canned machining cycle depending on a specification of machining conditions including a machining start point, a machining end point, and the size of an end mill to be used;
    a second step of calculating an estimated value of cutting force exerted on said end mill of an assumed tool path during said replaced canned machining cycle by using a response surface methodology based on a response surface depending on two or three explanation variables from among a maximum undeformed chip thickness, a cutting arc length, and an active angle of the end mill with respect to the workpiece;
    a third step of comparing the estimated value of the calculated cutting force with a predetermined range of values;
    a fourth step of determining a tool path of said end mill by repeating said second and third steps while changing said maximum undeformed chip thickness, cutting arc length, or active angle until said estimated value is within said predetermined range of values, and determining a feed rate of said end mill so as to keep cutting force alone said determined tool path to be constant; and
    a fifth step of repeating said second step through said fourth step at each machining cycle portion from a machining cycle in which a tool path of said end mill starts from said machining start point and reaches said machining end point.

2. An NC apparatus for performing predetermined machining of a workpiece using an end mill, said NC apparatus determining a tool path of said end mill with respect to said workpiece and a feed rate in each portion of said tool path, said apparatus comprising:
    machining condition specifying means for specifying machining conditions including a machining start point, a machining end point, and the size of an end mill to be used;
    replacing means for replacing a required machining shape of said workpiece with a predetermined canned machining cycle depending on said machining conditions specified by said machining condition specifying means;
    estimated value calculating means for calculating an estimated value of cutting force exerted on said end mill of an assumed tool oath during said replaced canned machining cycle by using a response surface methodology based on a response surface depending on two or three explanation variables from among a maximum undeformed chip thickness, a cutting arc length, and an active angle of the end mill with respect to the workpiece,
    evaluating means for comparing the estimated value of the calculated cutting force with a predetermined range of values
    determining means for determining a tool path of said end mill by repeating processing of said estimated value calculating means and evaluating means while changing said maximum undeformed chip thickness, cutting arc length, or active angle until said estimated value is within said predetermined range of values, and determining a feed rate of said end mill so as to keep cutting force along said determined tool path to be constant: and
    repeating means for repeating processing of said estimated value calculating means, evaluating means, and determining means at each machining cycle portion from a machining cycle in which a tool oath of said end mill starts from said machining start point and reaches said machining end point.

3. A computer memory product readable by a computer to execute a method for performing predetermined machining of a workpiece using an end mill, said computer memory product determining a tool path of said end mill with respect to said workpiece and a feed rate in each portion of said tool path, said computer memory product comprising:
    a first program that executes a process of replacing a required machining shape of said workpiece with a predetermined canned machining cycle depending on a specification of machining conditions including a machining start point, a machining end point, and the size of an end mill to be used;
    a second program that executes a process of calculating an estimated value of cutting force exerted on said end mill of an assumed tool path during said replaced canned machining cycle by using a response surface methodology based on a response surface depending on two or three explanation variables from among a maximum undeformed chip thickness, a cutting arc length, and an active angle of the end mill with respect to the workpiece;
    a third program that executes a process of comparing the estimated value of the calculated cutting force with a predetermined range of values;
    a fourth program that executes a process of determining a tool path of said end mill by repeating said second program and said third program while changing said maximum undeformed chip thickness, cutting arc length or active angle until said estimated value is within said predetermined range of values, and determining a feed rate of said end mill so as to keep cutting force along said determined tool path to be constant; and
    a fifth program that executes a process of repeating said second program through said fourth program at each machining cycle portion from a machining cycle in which a tool path of said end mill starts from said machining start point and reaches said machining end point.

4. A computer program product for use with an NC apparatus, comprising:
    a computer usable storage medium having a computer readable program code embodied therein for performing predetermined machining of a workpiece using an end mill, said computer readable program code determining a tool path of said end mill with respect to said workpiece and a feed rate in each portion of said tool path, said computer readable program code comprising:

a first code that causes a computer to replace a required machining shape of said workpiece with a predetermined canned machining cycle depending on a specification of machining conditions including a machining start point, a machining end point, and the size of an end mill to be used;

a second code that causes a computer to calculate an estimated value of cutting force exerted on said end mill of an assumed tool oath during said replaced canned machining cycle by using a response surface methodology based on a response surface depending on two or three explanation variables among a maximum undeformed chip thickness, cutting arc length and active angle of the end mill with respect to the workpiece;

a third code that causes a computer to compare the estimated value of the calculated cutting force with a predetermined range of values a fourth code that causes a computer to determine a tool oath of said end mill by repeating said second and third codes with changing said maximum undeformed chip thickness, cutting arc length or active angle until said estimated value is within said predetermined range of values, and determining a feed rate of said end mill so as to keep cutting force along said determined tool oath to be constant: and a fifth code that causes a computer to repeat said second code through said fourth code at each machining cycle portion from a machining cycle in which a tool path of said end mill starts from said machining start point and reaches said machining end point.

5. A dedicated numeric control (NC) machine equipped with an end mill for machining a workpiece, comprising:

an NC apparatus including an NC program generator;

a driving and controlling unit for driving and controlling motors of said end mill based on said NC program;

a computer aided machining (CAM) system for defining parameters used by said NC apparatus in generating said NC program;

wherein said NC apparatus, said driving and controlling unit and said CAM system exchange information online to provide dynamic control of the end mill wherein the NC apparatus further comprises:

means for calculating an estimated value of cutting force considering an assumed tool path and a feed rate at each portion of said assumed tool path;

means for comparing said estimated value of cutting force with a predetermined range of values for said end mill and a material of said workpiece;

means for adjusting said assumed tool path and said feed rate to acquire and maintain an actual value of cutting force within said predetermined range of values by providing said actual cutting force as feedback to said means for adjusting said assumed tool path and said feed rate and adjusting said assumed tool path and said feed rate accordingly to provide an actual tool path.

6. A method for generating a numeric control (NC) program that controls a dedicated NC machine equipped with an end mill and that determines an actual tool path of said end mill and a feed rate in each portion of said tool path, the method comprising:

replacing a required machining shape of said workpiece with one or more predetermined canned machining cycles depending on a specification of machining conditions including a machining start point, a machining end point, and the size of an end mill to be used;

calculating an estimated value of cutting force exerted on said end mill during said one or more canned machining cycles and comparing said estimated value with a predetermined range of values;

adjusting said estimated value of cutting force when said estimated value is not within said predetermined range of values by adjusting an estimated tool path and an estimated feed rate in each portion of said estimated tool path;

repeatedly calculating and adjusting said estimated value of cutting force until said estimated value is within said predetermined range of values;

adjusting said actual tool path of said end mill and said feed rate in each portion of said actual tool path to mirror said estimated tool path and said estimated feed rate to provide an actual value of cutting force within said predetermined range of values.

7. The method as claimed in claim 6, further comprising:

providing said actual culling force to said NC machine as feedback and dynamically adjusting said feed rate according to said feedback to maintain said actual value of cutting force within said predetermined range of values.

* * * * *